(12) United States Patent
Shukla et al.

(10) Patent No.: US 11,805,137 B2
(45) Date of Patent: Oct. 31, 2023

(54) METHOD AND SYSTEM FOR MACHINE LEARNING MODEL TESTING AND PREVENTIVE MEASURE RECOMMENDATION

(71) Applicant: Tata Consultancy Services Limited, Mumbai (IN)

(72) Inventors: Manish Shukla, Pune (IN); Rosni Kottekulam Vasu, Pune (IN); Sachin Premsukh Lodha, Pune (IN); Sanjay Seetharaman, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 531 days.

(21) Appl. No.: 17/163,764

(22) Filed: Feb. 1, 2021

(65) Prior Publication Data
US 2021/0377286 A1 Dec. 2, 2021

(30) Foreign Application Priority Data
Jun. 1, 2020 (IN) .............................. 202021022987

(51) Int. Cl.
*H04L 29/06* (2006.01)
*G06N 20/00* (2019.01)
(Continued)

(52) U.S. Cl.
CPC ........... *H04L 63/1416* (2013.01); *G06N 5/04* (2013.01); *G06N 20/00* (2019.01)

(58) Field of Classification Search
CPC ...... H04L 63/1416; G06N 20/00; G06N 5/04; G06F 21/577; G06F 2221/033
See application file for complete search history.

(56) References Cited

U.S. PATENT DOCUMENTS

2019/0026466 A1* 1/2019 Krasser ..................... G06N 7/01
2019/0318099 A1* 10/2019 Carvalho .............. G06F 21/577
(Continued)

OTHER PUBLICATIONS

Yuxin Ma, Tiankai Xie, Jundong Li, Ross Maciejewski. "Explaining Vulnerabilities to Adversarial Machine Learning through Visual Analytics" IEEE Transactions ov Visualization and Computer Graphics (11 pages) (Year: 2019).*

(Continued)

*Primary Examiner* — Joseph P Hirl
*Assistant Examiner* — Thomas A Gyorfi
(74) *Attorney, Agent, or Firm* — Finnegan, Henderson, Farabow, Garrett & Dunner LLP

(57) ABSTRACT

Data-driven applications depend on training data obtained from multiple internal and external data sources. Hence poisoning of the training data can cause adverse effects in the data driven applications. Conventional methods identifies contaminated test samples and avert them from entering into the training. A generic approach covering all data-driven applications and all types of data poisoning attacks in an efficient manner is challenging. Initially, data aggregation is performed after receiving a ML application for testing. A plurality of feature vectors are extracted from the aggregated data and a poisoned data set is generated. A plurality of personas are generated and are further prioritized to obtain a plurality of attack personas. Further, a plurality of security assessment vectors are computed for each of the plurality of attack personas. A plurality of preventive measures are recommended for each of the plurality of attack personas based on the corresponding security assessment vector.

20 Claims, 5 Drawing Sheets

(51) Int. Cl.
*G06N 5/04* (2023.01)
*H04L 9/40* (2022.01)

(56) References Cited

U.S. PATENT DOCUMENTS

2020/0019821 A1* 1/2020 Baracaldo-Angel ........................ H04L 63/123
2020/0050945 A1* 2/2020 Chen .................... G06F 18/214
2020/0082097 A1   3/2020 Poliakov

OTHER PUBLICATIONS

Lingchen Zhao, Shengshan Hu, Qian Wang, Jianlin Jiang, Chao Shen, Xiangyang Luo, Pengfei Hu, "Shielding Collaborative Learning: Mitigating Poisoning Attacks through Client-Side Detection" Journal of Latex Class Files, vol. 14, No. 8, Aug. 2015 (12 pages) (Year: 2015).*

Biggio, Battista et al., "Security evaluation of support vector machines in adversarial environments", Machine Learning, Jan. 2014, ARXIV, https://arxiv.org/pdf/1401.7727.pdf.

Biggio, Battista et al., "Security Evaluation of Pattern Classifiers under Attack", Transactions on Knowledge and Data Engineering, Apr. 2014, vol. 24, Issue: 4, pp. 984-996, IEEE, https://arxiv.org/pdf/1401.7727.pdf.

Singh, Tegjyot et al., "Data Driven Exploratory Attacks on Black Box Classifiers in Adversarial Domains", Computer Science, Mathematics, Mar. 2017, ARXIV, https://arxiv.org/pdf/1703.07909.pdf.

Ibitoye, Olakunle et al., "The Threat of Adversarial Attacks on Machine Learning in Network Security—A Survey", Cryptography and Security, Nov. 2019, ARXIV, https://arxiv.org/pdf/1703.07909.pdf.

* cited by examiner

METHOD AND SYSTEM FOR MACHINE LEARNING MODEL TESTING AND PREVENTIVE MEASURE RECOMMENDATION

PRIORITY CLAIM

This U.S. patent application claims priority under 35 U.S.C. § 119 to: India Application No. 202021022987, filed on Jun. 1, 2020. The entire contents of the aforementioned application are incorporated herein by reference.

TECHNICAL FIELD

The disclosure herein generally relates to the field of information security and, more particular, to a method and system for machine learning model testing and preventive measure recommendation.

BACKGROUND

Data-driven applications like Machine Learning (ML) models depend on training data obtained from multiple internal and external data sources. The data obtained from the external data sources are more prone to data poisoning compared to the data obtained from the internal data sources. However, the data obtained from the internal sources are prone to insider threat, for example, an employee of an organization may poison the data. Hence the data-driven applications are susceptible to data poisoning attacks and defending the data-driven applications from such attacks is challenging.

Conventional methods mainly identify contaminated test samples and avert them from entering the training process of the ML models. Further, the conventional models are very specific to a given ML model and a specific data poisoning attack. Hence a generic approach covering all data-driven applications and all types of data poisoning attacks in an efficient manner is challenging.

SUMMARY

Embodiments of the present disclosure present technological improvements as solutions to one or more of the above-mentioned technical problems recognized by the inventors in conventional systems. For example, in one embodiment, a method for machine learning model testing and preventive measure recommendation is provided. The method includes receiving a Machine Learning (ML) based application to be tested. Further, the method includes, aggregating data associated with the ML application to be tested from a plurality of external data sources. Furthermore, the method includes computing a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested. Furthermore, the method includes computing a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested. Furthermore, the method includes computing a poisoned data set based on the plurality of feature vectors by using a label flipping, wherein the poisoned dataset is a perturbed sample generated based on an impact of a corresponding feature in the ML based application to be tested. Furthermore, the method includes performing a training of a ML model with the aggregated data and the poisoned dataset. Furthermore, the method includes simultaneously combining a plurality of threat attributes to generate a plurality of personas, wherein each of the plurality of threat attributes is associated with a numeric value. Furthermore, the method includes computing a priority value for each of the plurality of personas based on the numeric value associated with each of the plurality of threat attributes corresponding to each of the plurality of personas by using one of, a summing of the numeric values associated with each plurality of threat attributes, a simple average method and a weighted average method. Furthermore, the method includes sorting the plurality of personas in a descending order based on the corresponding priority value to obtain a plurality of sorted personas. Furthermore, the method includes selecting a plurality of attack personas from the plurality of sorted personas based on a plurality of pre-determined threshold values corresponding to each of a plurality of system constraints associated with the system. Furthermore, the method includes computing a security assessment vector for each of the plurality of attack personas based on a plurality of security evaluation metrics by using the trained ML model, by: (i) computing, via the ML model trained using the aggregated data, a first set of security evaluation metrics for each of the plurality of attack personas (ii) computing, via the ML model trained using the aggregated data, a second set of security evaluation metrics for each of the plurality of attack personas and (iii) computing a difference between each element of the first set of security evaluation metrics and each element of the second set of security evaluation metrics to obtain the security assessment vector corresponding to each of the plurality of attack personas. Finally, the method includes recommending a plurality of preventive measures for each of the plurality of attack personas based on the security assessment vector using a ranking method, wherein the ranking method selects the plurality of preventive measures based on a minimum distance between a preventive measure and an attack persona.

In another aspect, a system for machine learning model testing and preventive measure recommendation is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a Machine Learning (ML) based application to be tested. Further, the one or more hardware processors are configured by the programmed instructions to, aggregate data associated with the ML application to be tested from a plurality of external data sources. Furthermore, the one or more hardware processors are configured by the programmed instructions to compute a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested. Furthermore, the one or more hardware processors are configured by the programmed instructions to compute a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested. Furthermore, the one or more hardware processors are configured by the programmed instructions to compute a poisoned data set based on the plurality of feature vectors by using a label flipping, wherein the poisoned dataset is a perturbed sample generated based on an impact of a corresponding feature in the ML based application to be tested. Furthermore, the one or more hardware processors are configured by the programmed instructions to perform a training of a ML model with the aggregated data and the poisoned dataset. Furthermore, the method includes the one or more hardware processors are configured by the programmed instructions to simultaneously combine a plurality of threat attributes to generate a plurality of personas, wherein each of the plurality of threat attributes is associated with a numeric value. Furthermore, the one or more hardware processors are configured by the programmed instructions to compute a priority value for each of the plurality of personas based on the numeric value associated with each of the plurality of threat attributes corresponding to each of the plurality of personas by using one of, a summing of the numeric values associated with each plurality of threat attributes, a simple average method and a weighted average method. Furthermore, the one or more hardware processors are configured by the programmed instructions to sort the plurality of personas in a descending order based on the corresponding priority value to obtain a plurality of sorted personas. Furthermore, the one or more hardware processors are configured by the programmed instructions to select a plurality of attack personas from the plurality of sorted personas based on a plurality of pre-determined threshold values corresponding to each of a plurality of system constraints associated with the system. Furthermore, the one or more hardware processors are configured by the programmed instructions to compute a security assessment vector for each of the plurality of attack personas based on a plurality of security evaluation metrics by using the trained ML model, by: (i) computing, via the ML model trained using the aggregated data, a first set of security evaluation metrics for each of the plurality of attack personas (ii) computing, via the ML model trained using the aggregated data, a second set of security evaluation metrics for each of the plurality of attack personas and (iii) computing a difference between each element of the first set of security evaluation metrics and each element of the second set of security evaluation metrics to obtain the security assessment vector corresponding to each of the plurality of attack personas. Finally, the one or more hardware processors are configured by the programmed instructions to recommend a plurality of preventive measures for each of the plurality of attack personas based on the security assessment vector using a ranking method, wherein the ranking method selects the plurality of preventive measures based on a minimum distance between a preventive measure and an attack persona.

In yet another aspect, a computer program product including a non-transitory computer-readable medium having embodied therein a computer program for method and system for machine learning model testing and preventive measure recommendation is provided. The computer readable program, when executed on a computing device, causes the computing device to receive a Machine Learning (ML) based application to be tested. Further, the computer readable program, when executed on a computing device, causes the computing device to, aggregate data associated with the ML application to be tested from a plurality of external data sources. Furthermore, the computer readable program, when executed on a computing device, causes the computing device to, compute a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested. Furthermore, the computer readable program, when executed on a computing device, causes the computing device to, compute a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested. Furthermore, the computer readable program, when executed on a computing device, causes the computing device to, compute a poisoned data set based on the plurality of feature vectors by using a label flipping, wherein the poisoned dataset is a perturbed sample generated based on an impact of a corresponding feature in the ML based application to be tested. Furthermore, the computer readable program, when executed on a computing device, causes the computing device to, perform a training of a ML model with the aggregated data and the poisoned dataset. Furthermore, the computer readable program, when executed on a computing device, causes the computing device to, simultaneously combine a plurality of threat attributes to generate a plurality of personas, wherein each of the plurality of threat attributes is associated with a numeric value. Furthermore, the computer readable program, when executed on a computing device, causes the computing device to, compute a priority value for each of the plurality of personas based on the numeric value associated with each of the plurality of threat attributes corresponding to each of the plurality of personas by using one of, a summing of the numeric values associated with each plurality of threat attributes, a simple average method and a weighted average method. Furthermore, the computer readable program, when executed on a computing device, causes the computing device to, sort the plurality of personas in a descending order based on the corresponding priority value to obtain a plurality of sorted personas. Furthermore, the computer readable program, when executed on a computing device, causes the computing device to, select a plurality of attack personas from the plurality of sorted personas based on a plurality of pre-determined threshold values corresponding to each of a plurality of system constraints associated with the system. Furthermore the computer readable program, when executed on a computing device, causes the computing device to, compute a security assessment vector for each of the plurality of attack personas based on a plurality of security evaluation metrics by using the trained ML model, by: (i) computing, via the ML model trained using the aggregated data, a first set of security evaluation metrics for each of the plurality of attack personas (ii) computing, via the ML model trained using the aggregated data, a second set of security evaluation metrics for each of the plurality of attack personas and (iii) computing a difference between each element of the first set of security evaluation metrics and each element of the second set of security evaluation metrics to obtain the security assessment vector corresponding to each of the plurality of attack personas. Finally, the computer readable program, when executed on a computing device, causes the computing device to, recommend a plurality of preventive measures for each of the plurality of attack personas based on the security assessment vector using a ranking method, wherein the ranking method selects the plurality of preventive measures based on a minimum distance between a preventive measure and an attack persona.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
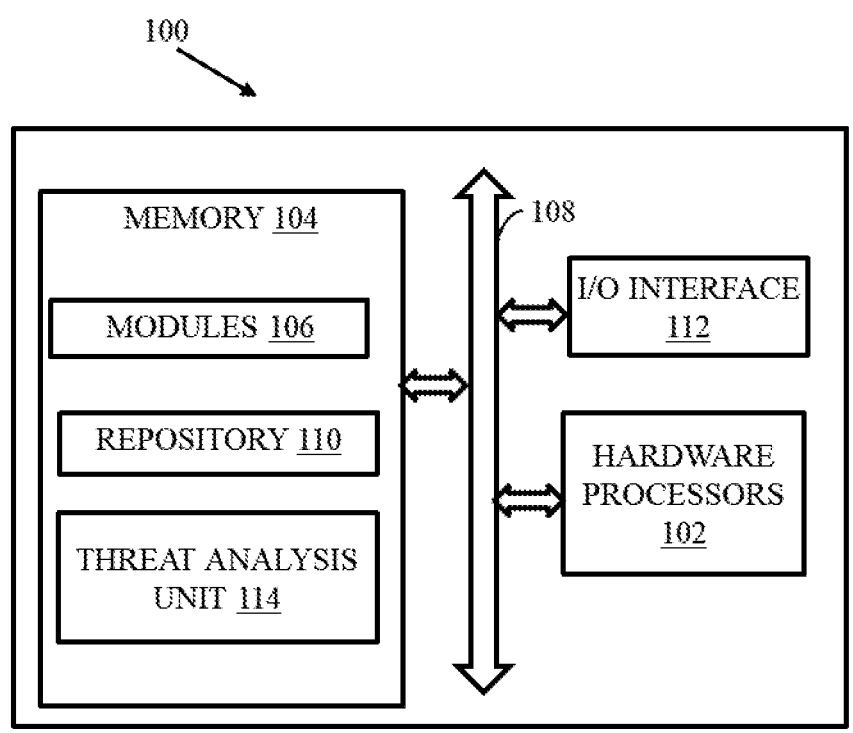
FIG. 1 is a functional block diagram of a system for machine learning model testing and preventive measure recommendation, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for machine learning model testing and preventive measure recommendation to recommend a plurality of preventive measures for a plurality of data poisoning attacks in Machine Learning (ML) models in an accurate manner. The system for machine learning model testing and preventive measure recommendation identifies a potential threat and provides a corresponding defensive mechanism against the potential threats. Initially, data aggregation is performed after receiving a ML application for testing. A plurality of feature vectors are extracted from the aggregated data and a poisoned data set is generated. Further, a ML model is trained using the aggregated data and the poisoned data set separately and a plurality of personas are computed simultaneously. The plurality of personas are further prioritized based on a corresponding priority value and a plurality of system constraints to obtain a plurality of attack personas. Further, a plurality of security assessment vectors are computed for the plurality of attack personas. A plurality of preventive measures are recommended for each of the plurality of attack personas based on the corresponding security assessment vector.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a functional block diagram of a system 100 for machine learning model testing and preventive measure recommendation, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server.

The one or more hardware processors 102 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a threat analysis unit 114. The memory 104 also includes a data repository 110 for storing data processed, received, and generated by the plurality of modules 106 and the threat analysis unit 114.

The plurality of modules 106 include programs or coded instructions that supplement applications or functions performed by the system 100 for machine learning model testing and preventive measure recommendation. The plurality of modules 106, amongst other things, can include routines, programs, objects, components, and data structures, which performs particular tasks or implement particular abstract data types. The plurality of modules 106 may also be used as, signal processor(s), state machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for machine learning model testing and preventive measure recommendation.

The data repository 110 may include a plurality of abstracted piece of code for refinement and data that is processed, received, or generated as a result of the execution of the plurality of modules in the module(s) 106 and the modules associated with the threat analysis unit 114. The data repository may also include aggregated data, training and test data associated with the machine learning model used in the method for machine learning model testing and preventive measure recommendation.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2A:
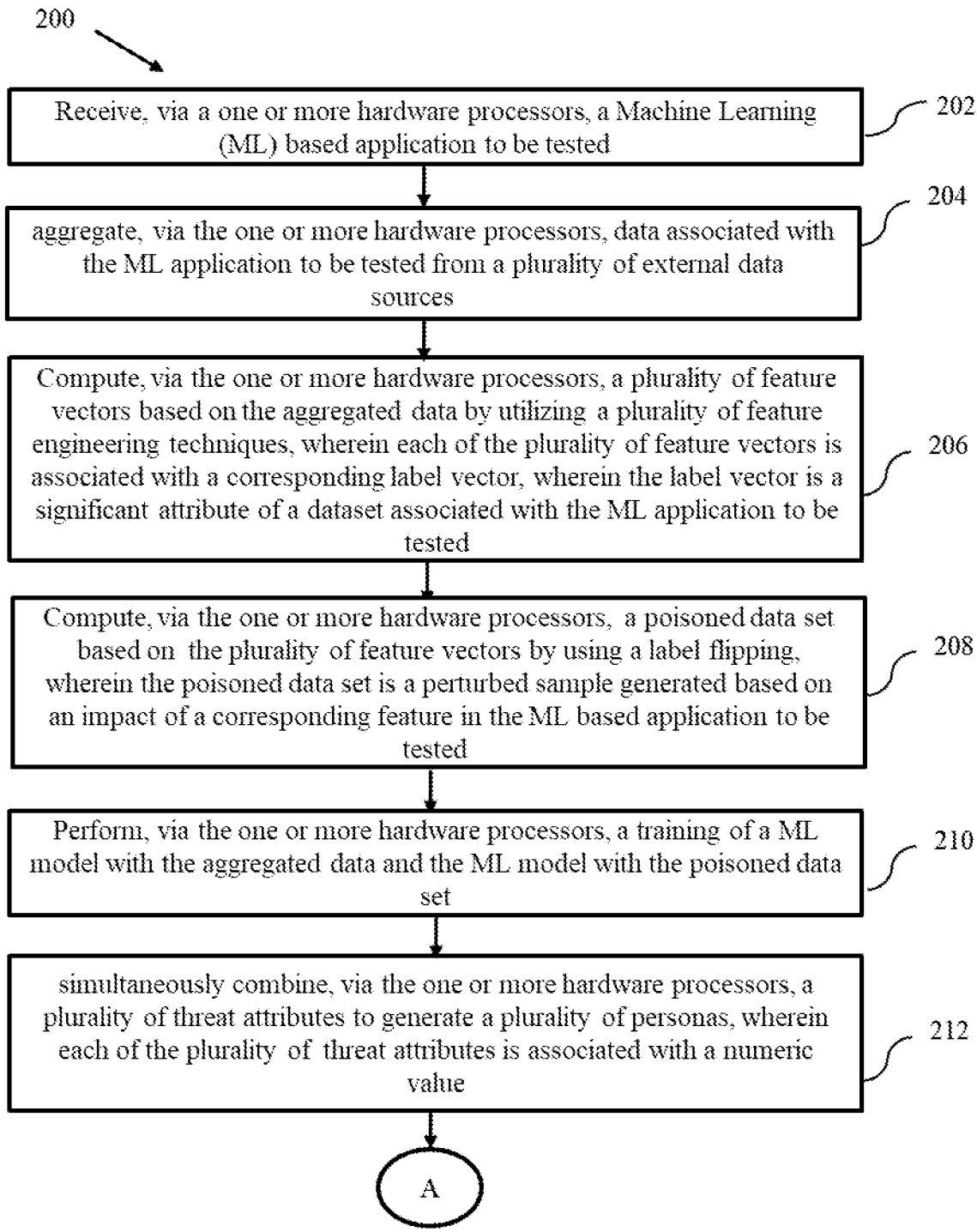
FIGS. 2A and 2B are exemplary flow diagrams for a method for machine learning model testing and preventive measure recommendation implemented by the system of FIG. 1, in accordance with some embodiments of the present disclosure.
Figure 2B:
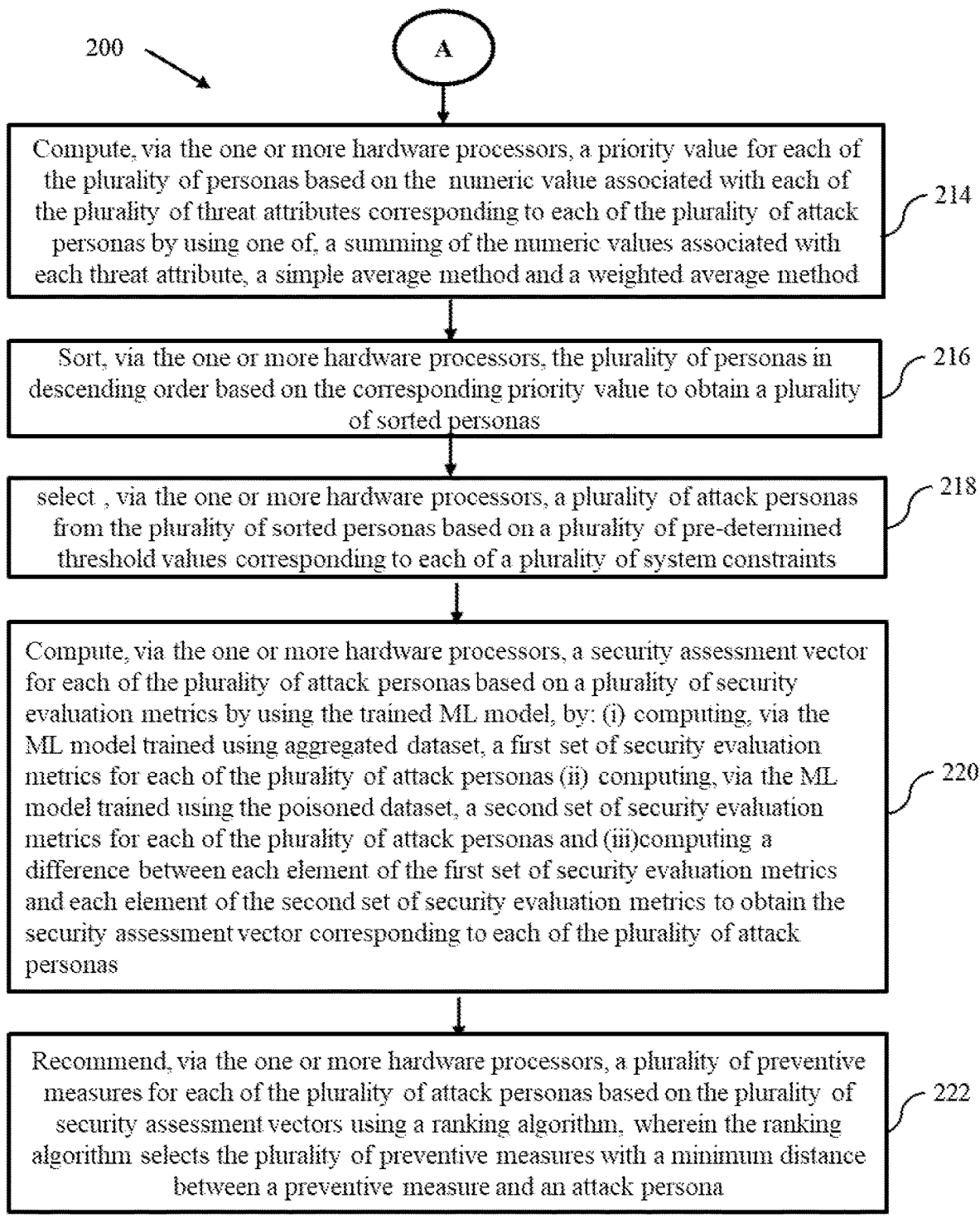

FIGS. 2A and 2B are exemplary flow diagrams for a processor implemented method for machine learning model testing and preventive measure recommendation implemented by the system of FIG. 1, according to some embodiments of the present disclosure. In an embodiment, the system 100 comprises one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2A and FIG. 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 receive a Machine Learning (ML) based application to be tested. For example, a malware classification ML model with OS (Operating System) native processes including malicious and benign executable for training ML models, an image classification ML model using bank note dataset, a vehicle dataset, a face dataset and an animal dataset, a spam classification ML model using spam and ham email dataset, a phishing classification ML model using phishing and benign emails, a wine classification ML model using extracted features from wine quality, a speaker classification ML model using speech and audio dataset and the like.

At step 204 of the method 200, the one or more hardware processors 102 aggregate data associated with the ML based application to be tested from a plurality of external data sources. The data includes textual data, binary data and multimedia data. Further, the data can be a structured data, an unstructured data and a semi-structured data. The plurality of external data sources includes online and offline data sources. For example, the bank note dataset, the vehicle dataset, the face dataset and the animal dataset for image classification ML model, spam and ham email dataset for spam classification ML model and the like.

At 206 of the method 200, the one or more hardware processors 102 compute a plurality of feature vectors from the aggregated data by utilizing a plurality of feature engineering techniques. Each of the plurality of feature vectors is associated with a corresponding label vector. The label vector is a significant attribute of a dataset associated with the ML application to be tested. The plurality of feature engineering techniques includes a bag of words, a scalarisation, a normalization, a recoding and a feature transformation.

At 208 of the method 200, the one or more hardware processors 102 compute a poisoned dataset based on the plurality of feature vectors by using a label flipping. The poisoned dataset is a perturbed sample generated based on an impact of a corresponding feature in the ML based application to be tested. The method for generating the poisoned dataset includes the following steps: (i) receiving a flip budget, the data, the plurality of feature vectors and the corresponding label vectors. The flip budget is pre-computed based on a plurality of system constraints including a number of queries, a type of updation performed by the ML model, network latency, a system load, a query processing time, a processing limit of a data poisoning algorithm, a time delay between successive queries, a percentage of total data size and a size of the data set. The type of updation can be one of, a batch updation and an online updation (ii) segmenting the data into a training data and a testing data (iii) computing a loss function based on the training data, the plurality of feature vectors of the training data and the corresponding label vectors by using an optimization algorithm. The optimization algorithm can be a gradient based optimization algorithm or a non-gradient based algorithm (iv) sorting the training data based on the computed loss function (v) selecting a plurality of data points from the sorted training data based on the flip budget and (vi) flipping the label vectors of the plurality of selected data points to generate the poisoned data set.

In an embodiment, flipping the label vector of a data point is explained below: For example, the dataset used for training an anti-malware solution usually has a plurality of features (strings, memory access, filesystem and registry) and a corresponding label called 'malicious' with a value from a set {true, false}. Depending on this label value, the ML algorithms build their model using the rest of the features. In a label flipping attack, the aim is to toggle the value of 'malicious' label so that there are detrimental effects on the model. In the above example, there are 4 features (strings, memory access, filesystem and registry) and one label (malicious). Based on the attack algorithm, if this data point is contributing substantially (say 40% or more) to the model then the attacker can change the value of label 'malicious' from true to false, that is, the sample will be treated as benign and used for training which further increases the error and false negatives, whereas if the same steps are carried for a benign sample (that is false to true flipping) then it increases the false positives. The pseudo code for the above example is given below:

```
Un flipped Data
{
    "strings": ["http://www.example.com", "127.0.0.1", "4563", "https://dsdkasdkasdasd.com"],
    "memoryaccess" : true,
    "filesystem" : true,
    "registry" : true,
    "malicious": true
}
Flipped Data
{
    "strings": ["http://www.example.com", "127.0.0.1", "4563", "https://dsdkasdkasdasd.com"],
    "memoryaccess" : true,
    "filesystem" : true,
    "registry" : true,
    "malicious": false // flipped
}
```

In an embodiment, "the number of queries" is explained below: Let $X=\{x_1, x_2, \ldots, x_n\}$ be a set of data points. A data point is an identifiable element in a dataset. When an attacker tries to poison a subset of data points X' from X, wherein $X' \subset X$, in order to check the effectiveness of an attack the attacker requires to check the change in the error rate by submitting multiple such X'. The attack strategy which results in highest error rate is the best strategy. In an online environment or offline environment, there could be inbuilt intelligence which may flag too many submissions of X' as suspicious. The number of submissions of X' in this embodiment is "the number of queries".

At 210 of the method 200, the one or more hardware processors 102 perform a training of the ML model with the aggregated data and further the ML model is trained using the poisoned data set.

At 212 of the method 200, the one or more hardware processors 102 simultaneously combine a plurality of threat attributes to generate a plurality of personas. Each of the plurality of threat attributes is associated with a numeric value. The plurality of threat attributes includes an attacker's skill, an attack time constraint, a percentage of data accessible to an attacker, a number of attacker queries, an attack complexity, a transferability of attack, an attacker's knowledge about the ML application to be tested, an attacker's reachability and an attacker's goal.

At 214 of the method 200, the one or more hardware processors 102 compute a priority value for each of the plurality of personas based on the numeric value associated with each of the plurality of threat attributes corresponding to each of the plurality of attack personas. The priority value is computed by using a summing of the numeric values associated with each threat attribute or a simple average method or a weighted average method. For example, if the sum of numeric values associated with each threat attribute of a persona is more, then the priority for the corresponding persona is more.

In an embodiment, the numeric value for the threat attribute "the attacker's skill" is {high:3, medium:2, low:1}, the numeric value for the threat attribute "the attack time constraint" is governed by rate of arrival of data and it varies from 10 millisecond (for online setup) to a day (for offline setup), the numeric value for the threat attribute "the percentage of data accessible to attacker" is 40, the numeric value for the threat attribute "the number of attacker queries" depends on system where the ML model is going to be deployed and usually varies from 2-3 to few hundreds, the numeric value for the threat attribute "the attack complexity" is described with respect to system parameters, for example, CPU usage should be less than 20%, Memory usage should be less than 1 GB and I/O events should be less than 1000 events per second and the numeric value for the threat attribute "transferability of attack" is decided corresponding to the surrogate model on which the attack is evaluated/performed and the number of victim models where the prediction error rate has increased above a threshold, for example 20%. This increase in error rate is highly specific to the application in which the ML model is used, for example, a classifier which predicts whether it will rain today may accommodate 20% error rate, whereas an application for cancer diagnosis may have catastrophic results for 20% change in error.

At 216 of the method 200, the one or more hardware processors (102) sort the plurality of personas in descending order based on the corresponding priority value to obtain a plurality of sorted personas.

At 218 of the method 200, the one or more hardware processors 102 select a plurality of attack personas from the plurality of sorted personas based on a plurality of pre-determined threshold values corresponding to each of the plurality of system constraints. The plurality of system constraints include the number of queries, the type of updation performed by the ML model, the network latency, the system load, the query processing time, the processing limit of a data poisoning algorithm, the time delay between successive queries, the percentage of total data size and the size of the data set. The pre-determined threshold for each of the plurality of system constraints are: the number of queries=0, network latency=20 ms, the system load (CPU time=40% of total CPU time, memory=1 GB, 10=100010 events), the query processing time=10 to 12 milliseconds, the processing limit of the data poisoning algorithm=20% approximately (however, it depends on the application), the time delay between successive queries=10 to 20 milliseconds, the percentage of total data size=15 to 20%. The type of updation performed by the ML model depends on the type of data source and the size of the data set depends on the algorithm used in the ML model.

At 214 of the method 200, the one or more hardware processors 102 compute a security assessment vector for each of the plurality of attack personas based on a plurality of security evaluation metrics by using the trained ML model by: (i) computing a first set of security evaluation metrics for each of the plurality of priority attack personas using the trained ML model trained using the aggregated data (ii) computing a second set of security evaluation metrics for each of the plurality of priority attack personas using the trained ML model trained using poisoned data set and (iii) computing a difference between each element of the first set of security evaluation metrics and each element of the second set of security evaluation metrics to obtain the security assessment vector corresponding to each of the plurality of attack personas.

In an embodiment, the plurality of security evaluation metrics includes a performance degradation, a False Positive Rate (FPR), a True Positive Rate (TPR), a fraction of compromised components, an attack performance and a susceptibility of application.

At 216 of the method 200, the one or more hardware processors 102 recommend a plurality of preventive measures for each of the plurality of attack personas based on the plurality of security assessment vectors using a ranking method. The ranking method selects the plurality of preventive measures with a minimum distance between a preventive measure and an attack persona. For an example persona: {features:1, parameter:0, model:1, input/output:0, training:1, test:1, integrity:1, availability:0, skill:2, accessibledata: 40} and the corresponding metrics is: {error:40%, FPR: 30%, TPR:60%, fraction:10%, performance_cpu:25%, performance_mem:60%, susceptibility: high}, the preventive measure with minimum distance is suggested as a best possible preventive measure among the plurality of security assessment vectors. The corresponding preventive measure is {data sanitization: outlier detection, robust learning method, pre-processing, validation against known baseline, limiting queries, penalize users/data points}.

Figure 3:
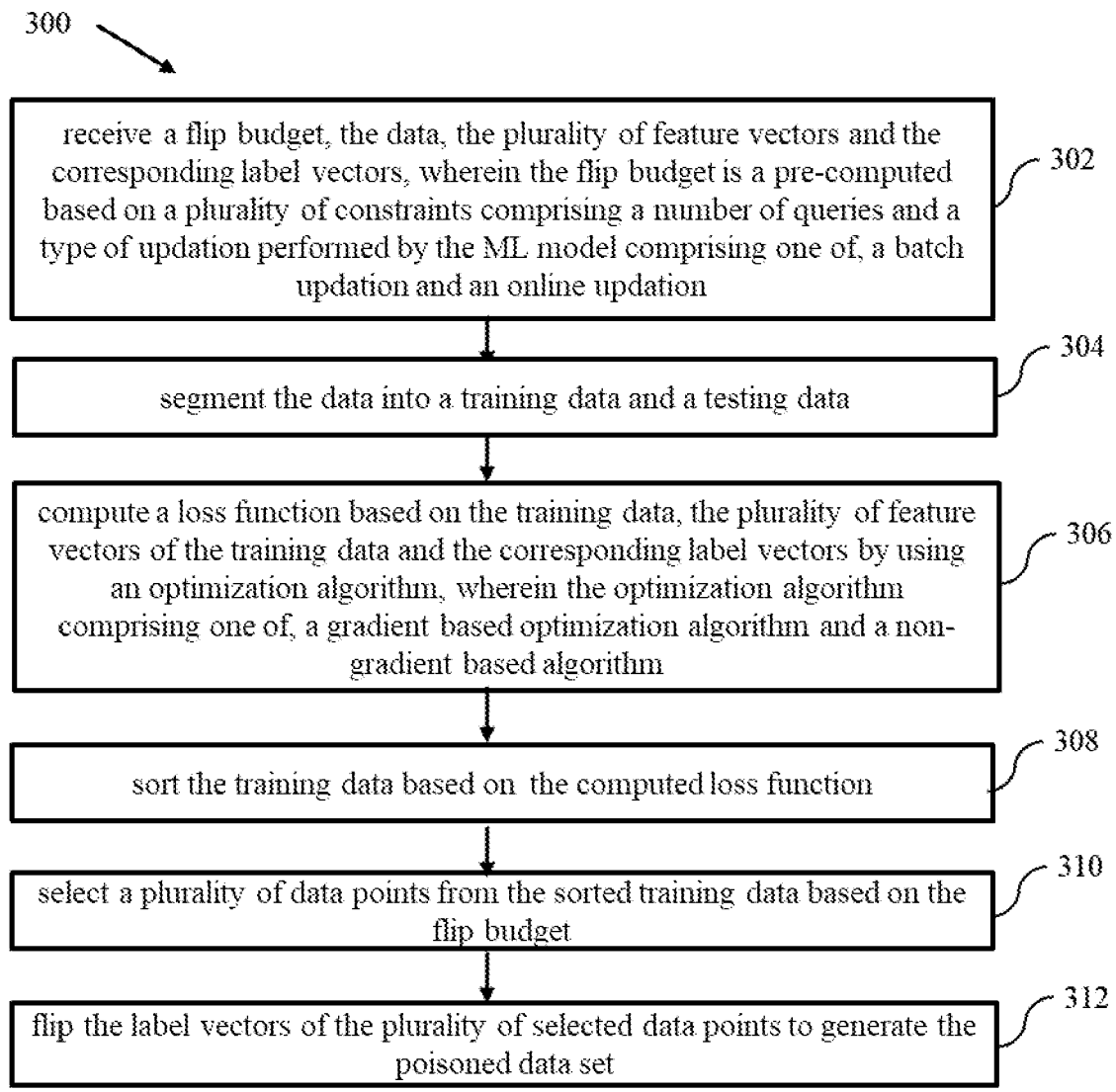
FIG. 3 is an exemplary flow diagram for a method for generating poisoned data, in accordance with some embodiments of the present disclosure.

FIG. 3 is an exemplary flow diagram for the processor implemented method for generating poisoned data, in accordance with some embodiments of the present disclosure. Now referring to FIG. 3, at step 302, the flip budget, the data, the plurality of feature vectors and the corresponding label vectors are received as input. The flip budget is pre-computed based on the plurality of constraints comprising the number of queries and the type of updation performed by the ML model, the network latency, the system load, the query processing time, the processing limit of the data poisoning algorithm, the time delay between successive queries, the percentage of total data size and the size of the data set. The type of updation can be one of, a batch updation and an online updation. At step 304, the data is segmented into a training data and a testing data. At step 306, a loss function is computed based on the training data, the plurality of feature vectors of the training data and the corresponding label vectors by using an optimization algorithm. The optimization algorithm can be a gradient based optimization algorithm or a non-gradient based algorithm. At step 308, sorting is performed on the training data based on the computed loss function. At step 310, a plurality of data points are selected from the sorted training data based on the flip budget. At step 310, the label vectors of the plurality of selected data points are flipped to generate the poisoned data set.

In an embodiment, the flip budget is computed as follows: A discoverability function is defined as a function which maps the plurality of data points perturbed to the probability of being discovered. Let d be the plurality of data points which are accessible to an attacker and p be the probability of being discovered, then the discoverability function f is defined as f: d→p, wherein, 0<d≤1 and 0<p≤1, that is if naive user poison the plurality of data points then there is a high probability of the naïve user being caught, whereas the probability of finding a very small fractional change in data could be near to 0. The discoverability function is discovered empirically by plotting the value d from 0<d≤1 in steps of 0.01 and the corresponding probability of discoverability p. Here, the probability is calculated by giving d to N oracles and recording their response. Here, if some k oracles identify correctly that there is a modification in the dataset, then p=k/N. Here, the oracle can be a human or outlier detection algorithm.

The pseudo code for computing the flip budget is given below:

```
double calculateBudget(parameters) {
    double flip_budget = 0.0;
    double query_data = 0.0;
    if (parameters[queries] == 0){
        return 0.0;
    }
    if (parameters[updation_type] == 'online') {
        if (parameters[query_size] != -1) {
            query_data = parameters[queries] * parameters[query_size];
            // complete data is available
            if (query_data) >= parameters[total_data] {
                query_data = parameters[total_data];
            }
            query_data = adjustForSystemLoad(parameters, query_data);
            flip_budget = (query_data/parameters[total_data]);
            // we are limited by the query size
            return min(flip_budget, parameters[accessible_data]);
        }
        else {
            // there is no limit on query size, so whole data is available
            query_data         =         adjustForSystemLoad(parameters,
parameters[total_data]);
            flip_budget = (query_data/parameters[total_data]);
            return min(flip_budget, parameters[accessible_data]);
        }
    }
    else {
        // in batch/off-line mode the whole of data could be modified
        query_data         =         adjustForSystemLoad(parameters,
parameters[total_data]);
        flip_budget = (query_data/parameters[total_data]);
        return min(flip_budget, parameters[accessible_data]);
    }
}
double adjustForSystemLoad(parameters, query_data) {
    while (True) {
        cpu_req = calculate_cpu_usage(query_data);
        mem_usage = calculate_mem_usage(query_data);
        network_latency = calculate_network_latency(query_data);
        system_load     =     predict_system_load(cpu_req, mem_usage,
network_latency);
        if (system_load <= parameters[system_load]) {
            break;
        }
        query_data = reduce_data_size(query_data, 0.02);
    }
    return query_data;
}
```

The pseudo code for calculation of flip budget is explained as: The pseudo code receives the plurality of system parameters as input. If the model updation mode is 'online' then the algorithm first calculates the allowable data that can be sent by the queries. This is achieved by taking the product of number of queries and the total data that can be sent on individual query. In case there is no limit on per query data or calculated total data using queries is greater than or equal to total data available or the model updation mode is 'batch' then the flip budget is calculated on the complete dataset. The size of data available for poisoning is further adjusted as per the system load and allowable thresholds. Once the load adjusted data size is available for poisoning, then the load adjusted data is used for calculating the fraction of total data it represents. Finally, a minimum of the load adjusted fraction of total data and fraction of data that is actually accessible to the attacker is chosen. This is the maximum size of data points available for poisoning and it is the maximum flip budget.

In an embodiment, if the discoverability function is available then the flip budget is further adjusted according to it. This tuned fraction is called the optimal flip budget for which the probability of detection is low.

Figure 4:
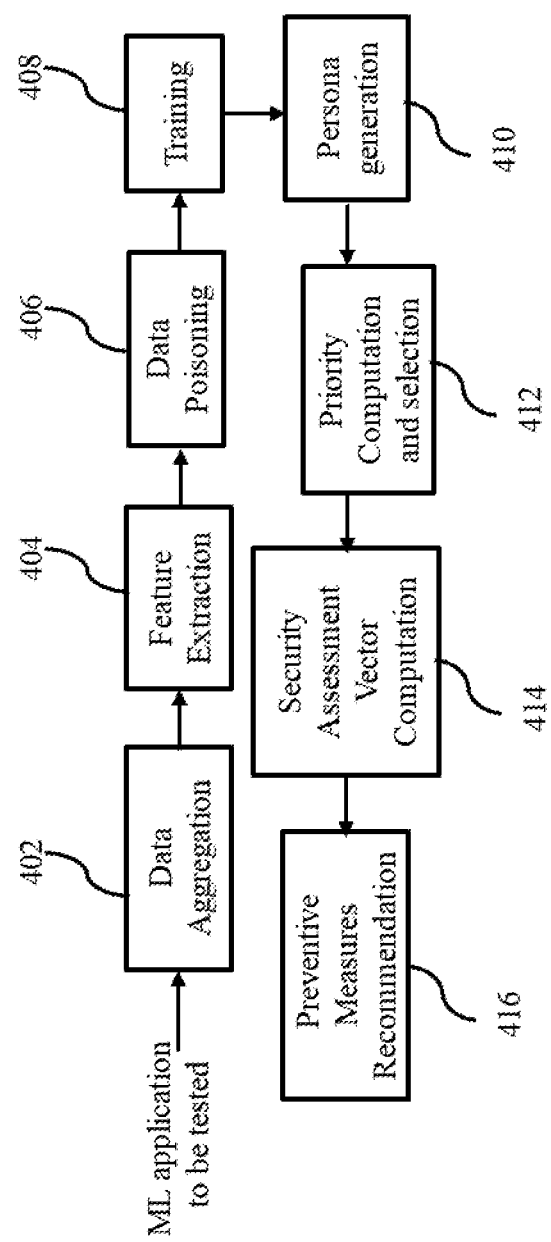
FIG. 4 illustrates an architectural overview of the system of FIG. 1 for machine learning model testing and preventive measure recommendation, in accordance with some embodiments of the present disclosure.

FIG. 4 illustrates an architectural overview of the system of FIG. 1 for machine learning model testing and preventive measure recommendation, in accordance with some embodiments of the present disclosure. Now referring to FIG. 4, the architectural overview includes a data aggregation module 402, a feature extraction module 404, a data poisoning module 406, a training module 408, a persona generation module 410, a priority computation and selection module 412, a security assessment vector computation module 414 and a preventive measures recommendation module 416. The above modules are present in the threat analysis unit 114.

The aggregation module 402 aggregates the plurality of data from the plurality of online and offline sources. The aggregated data includes the textual data, the binary data and the multimedia data. The aggregated data can be the structured data, the unstructured data and the semi-structured data. The data is aggregated from the plurality of online and offline data sources. The plurality of features are extracted by the feature extraction module 404. The features are extracted by the plurality of feature engineering techniques including the bag of words, the scalarisation, the normalization, the recoding and the feature transformation. The data poisoning module 406 generates the poisoned data set from the plurality of feature vectors and the poisoned data set is further used for training the ML model by the training module 408. The training module 408 further trains the ML model using aggregated data too. Simultaneously, the plurality of threat attributes are combined to generate the plurality of personas by the persona generation module 410. The priority associated with each persona is computed by the priority computation and selection module 412. Further, the priority computation and selection module 412 sorts the plurality of personas based on the corresponding priority value. The plurality of attack personas are selected from the plurality of sorted personas based on the plurality of pre-determined system constraints by the priority computation and selection module 412. Further, the security assessment vector computation module 414 computes the security assessment vector for each of the plurality of attack personas based on the plurality of security evaluation metrics using the trained ML model. The preventive measures recommendation module 416 recommends the plurality of preventive measures for each of the plurality of attack personas based on the plurality of security assessment vectors using the ranking method.

The method for generating the poisoned dataset by the data poisoning module 406 includes the following steps: (i) receiving the flip budget, the data, the plurality of feature vectors and the corresponding label vectors. The flip budget is the pre-computed based on a plurality of constraints including a number of queries, a type of updation performed by the ML model, the network latency, the system load, the query processing time, the processing limit of the data poisoning algorithm, the time delay between successive queries, the percentage of total data size and the size of the data set. The type of updation can be the batch updation or the online updation (ii) segmenting the data into the training data and the testing data (iii) compute the loss function based on the training data, the plurality of feature vectors of the training data and the corresponding label vectors by using the optimization algorithm. The optimization algorithm can be the gradient based optimization algorithm or the non-gradient based algorithm (iv) sorting the training data based on the computed loss function (v) selecting the plurality of data points from the sorted training data based on the flip budget and (vi) flipping the label vectors of the plurality of selected data points to generate the poisoned data set.

The threat analysis unit 114, when executed by the one or more processors of the system 100, receives the Machine Learning (ML) based application to be tested. For example, the malware classification ML model with OS (Operating System) native processes including malicious and benign executable for training ML models, the image classification ML model using bank note dataset, the vehicle dataset, the face dataset and the animal dataset, the spam classification ML model using spam and ham email dataset, the phishing classification ML model using phishing and benign emails, the wine classification ML model using extracted features from wine quality, the speaker classification ML model using speech and audio dataset and the like.

Further, the threat analysis unit 114, when executed by one or more processors of the system 100, aggregates the data associated with the ML application to be tested from the plurality of external data sources. The data includes the textual data, the binary data and the multimedia data. The data can be the structured data (tabular format) or the unstructured data or the semi-structured data. The plurality of external data sources comprising online and offline data sources. For example, bank note dataset, vehicle dataset, face dataset and animal dataset for image classification model, spam and ham email dataset for spam classification model and the like.

Further, the threat analysis unit 114, when executed by one or more processors of the system 100, computes the plurality of feature vectors based on the aggregated data by utilizing the plurality of feature engineering techniques. The plurality of feature engineering techniques includes the bag of words, the scalarisation, the normalization, the recoding and the feature transformation. Each of the plurality of feature vectors is associated with the corresponding label vector. The label vector is a significant attribute of a dataset associated with the ML application to be tested.

In an embodiment, an algorithm for computing the plurality of feature vectors is given below:

```
Input: D = {d_1,...,d_N}, C = {C_1,...,C_M}  // D → dataset, and C →
       configurations data,
X = [ ],Y = [ ]. sample  // Y → target label for corresponding input data
                //X → feature representation of the input
for d ∈ D do
    for c ∈ do
        tokens = parse(d)
        switch c do
            case BOW: applyBagOfWords(tokens, X, Y)
            case SCALE: applyScalarisation(tokens, X, Y)
            case NORMAL: applyNormalization(tokens, X, Y)
            ...
            case RECODE: applyRecoding(tokens, X, Y)
            ...
            case TRANSFORM:
                featureTransformation(tokens, X, Y)
        // In case of higher dimension apply Principal Component Analysis or
                such
    end for
end for
return (X, Y)   // tuple of feature and label vectors
```

Further, the threat analysis unit 114, when executed by one or more processors of the system 100, computes the poisoned data set based on the plurality of feature vectors by using the label flipping. The poisoned data set is the perturbed sample generated based on the impact of the corresponding feature in the ML based application to be tested. The method for generating the poisoned dataset includes the following steps: (i) receiving the flip budget, the data, the plurality of feature vectors and the corresponding label vectors. The flip budget is the pre-computed based on a plurality of constraints including a number of queries and a type of updation performed by the ML model, the network latency, the system load, the query processing time, the processing limit of the data poisoning algorithm, the time delay between successive queries, the percentage of total data size and the size of the data set. The type of updation can be the batch updation or the online updation (ii) segmenting the data into the training data and the testing data (iii) computing the loss function based on the training data, the plurality of feature vectors of the training data and the corresponding label vectors by using the optimization algorithm. The optimization algorithm can be the gradient based optimization algorithm or the non-gradient based algorithm (iv) sorting the training data based on the computed loss function (v) selecting the plurality of data points from the sorted training data based on the flip budget and (vi) flipping the label vectors of the plurality of selected data points to generate the poisoned data set.

In an embodiment, an algorithm for generating the poisoned dataset is given below:

```
X → feature vectors, Y → label vectors, K → flip budget, D = {d₁, ..., d_N} be
the data set, A = {a₁,...,a_K} be the attack strategies
    Input: A, D, X, Y, K, threshold.
    Z = { }
    for a ∈ A do
        (train,test) = splitData(D)
        Y' = [ ]                        // Perturbed/poisoned label vector
        L = computeLossFunction(train, X, Y )
        // Example, gradient of loss function
        if K > 0 then
            train' = selectDataPoints(train, K) // Select K% from
        sorted dataset
        else
            train' = train              // Select complete
                dataset
        end if
        while true do
            Y' = applyFlipStrategy(train', a) // Y' is the perturbed or
        poisoned labels
            model = trainModel(train', X, Y')
            error = calculateError(model, test)
            if error > threshold then
                Z= Z ∪{(a, X, Y, Y')}    // Inserting the tuple in set
            break
            end if
        end while
    end for
    return Z
    //Return set of tuple of strategy, feature vector, label vector, perturbed
label vector
```

Further, the threat analysis unit 114, when executed by one or more processors of the system 100, performs the training of a ML model with the aggregated data and the ML model with the poisoned data set.

In an embodiment, the training of the ML model with the aggregated data is performed by the following steps: The aggregated data is segmented into an aggregated training dataset and an aggregated testing dataset. Further, an ML model is selected based on the dataset and the application requirement. Training process includes initializing some random values for weights W and bias b and attempting to predict the output with those values. This is a repetitive process (by updating W and b) and continues till a minimized prediction error is obtained. The trained model is evaluated using the aggregated testing dataset. The ML model is further improved by tuning a set of corresponding hyper parameters.

In an embodiment, the training of the ML model with the poisoned data set is performed by the following steps: The poisoned data set is segmented into a poisoned training dataset and a poisoned testing dataset. Training the above selected ML model includes initializing some random values for weights W and bias b and attempting to predict the output with those values. This is a repetitive process (by updating W and b) and continues till a minimized prediction error is obtained. The trained model is evaluated using the poisoned data set testing dataset. The ML model is further improved by tuning the set of corresponding hyper parameters.

Further, the threat analysis unit 114, when executed by one or more processors of the system 100, simultaneously combines the plurality of threat attributes to generate the plurality of personas. Each of the plurality of threat attributes is associated with the numeric value. The plurality of threat attributes includes the attacker's skill, the attack time constraint, the percentage of data accessible to the attacker, the number of attacker queries, the attack complexity, the transferability of attack, the attacker's knowledge about the ML application to be tested, the attacker's reachability and the attacker's goal.

Further, the threat analysis unit 114, when executed by one or more processors of the system 100, computes the priority value for each of the plurality of personas based on the numeric value associated with each of the plurality of threat attributes corresponding to each of the plurality of attack personas. The priority value is computed using the summing of the numeric values associated with each threat attribute or the simple average method or the weighted average method. For example, if the sum of numeric values associated with each threat attribute of a persona is more, then the priority for the corresponding persona is more.

In an embodiment, the numeric value for "the attacker's skill" attribute is {high:3, medium:2, low:1}, the numeric value for "the attack time constraint" attribute is governed by rate of arrival of data, varying from 10 millisecond (for online setup) to a day (for offline setup), the numeric value for "the percentage of data accessible to attacker" is 40, the numeric value for "the number of attacker queries" attribute depends on system where the ML model is going to be deployed, usually varies from 2-3 to few hundred the numeric value for "the attack complexity" attribute is described with respect to system parameters, for example, CPU usage should be less than 20%, Memory usage should be less than 1 GB and I/O events should be less than 1000 events per second and the numeric value for the "transferability of attack" attribute is discussed corresponding to the surrogate model on which the attack is evaluated/performed and the number of victim models where the prediction error rate has increased above a threshold, for example 20%. This increase in error rate is highly specific to the application in which the ML model is used, for example, a classifier which predicts whether it will rain today may accommodate 20% error rate, whereas an application for cancer diagnosis may have catastrophic results for 20% change in error.

In an embodiment, each attack persona of an attacker is defined as a combination of the plurality of threat attributes (a), for example, the attacker's knowledge about the ML model (knowledge of features, model/parameter, input/output), the attacker's reachability to dataset (training/test), the attacker's goals (to affect integrity/availability), the attacker's skill (low/medium/high), % of data accessible with additional system dimensions, the attack time constraint, the number of attacker queries, the attack complexity and the transferability of attack. The above attributes are combined in a plurality if ways to obtain the plurality of attack personas. More formally, let P={$\alpha_1, \ldots, \alpha_t$} be the plurality of threat attributes defining an attacker's persona. Similarly, let P={$P_1, \ldots, P_T$} be the plurality of personas obtained by different combination of the plurality of threat attributes.

Further, the threat analysis unit 114, when executed by one or more processors of the system 100, sorts the plurality of personas in descending order based on the corresponding priority value to obtain a plurality of sorted personas.

Further, the threat analysis unit 114, when executed by one or more processors of the system 100, selects the plurality of attack personas from the plurality of sorted personas based on a plurality of pre-determined threshold values corresponding to each of a plurality of system constraints. The plurality of system constraints include the number of queries, the type of updation performed by the ML model, the network latency, the system load, the query processing time, the processing limit of the data poisoning algorithm, the time delay between successive queries, the percentage of total data size and the size of the data set. The pre-determined threshold for each of the plurality of system constraints are: the number of queries=0, network latency=20 ms, the system load (CPU time=40% of total CPU time, memory=1 GB, 10=100010 events), the query processing time=10 to 12 milliseconds, the processing limit of the data poisoning algorithm=20% approximately (however, it depends on the application), the time delay between successive queries=10 to 20 milliseconds, the percentage of total data size=15 to 20%. The type of updation performed by the ML model depends on the type of data source and the size of the data set depends on the algorithm used.

Further, the threat analysis unit 114, when executed by one or more processors of the system 100, computes the security assessment vector for each of the plurality of attack personas based on the plurality of security evaluation metrics by using the trained ML model by: (i) computing the first set of security evaluation metrics for each of the plurality of priority attack personas using the trained ML model trained using the aggregated data (ii) computing the second set of security evaluation metrics for each of the plurality of priority attack personas using the trained ML model trained using poisoned data set and (iii) computing the difference between each element of the first set of security evaluation metrics and each element of the second set of security evaluation metrics to obtain the security assessment vector corresponding to each of the plurality of attack personas.

In an embodiment, the plurality of security evaluation metrics includes the performance degradation, the False Positive Rate (FPR), the True Positive Rate (TPR), the fraction of compromised components, the attack performance and the susceptibility of application.

In an embodiment, an algorithm for computing the security assessment vector are given below:

```
Input: P, S, Z, D    //P is persona, S is system parameters, Z is tuple, D
is dataset
   M = { }            // Set of tuple of security metrics for a given
   for s ∈ S do           persona
      value = checkContradiction(s, P) //Example, if number of queries is 0
                                        then no attack is possible
   if value==
   true then
   return M
   end if
   end for
   (train,test) = splitData(D)
   for z ∈ Z do
      X = getFeatureVector(z), Y = getLabels(z),
      Y" = getFlippedLabel(z), attack = getAttackingStrategy(z)
      model_o = trainModel(train, X, Y )    //Original Model
      model_p = trainModel(train, X, Y")    //Poisoned Model
      error = calculateError(model_o, model_p, test)
      pr=calculateFalsePositiveRate(model_o,model_p,te
      st)
      tpr=calculateTruePositiveRate(model_o,model_p,test)
      perf = calculatePerformance(attack) //runtime performance
      sus = calculateSusceptibility(model_o, model_p, test)
      frac = calculateCompromisedComponents(D, X, Y, Y")
      M = M∪{(attack, error, fpr, tpr, perf, sus, frac)}
   end for
return M
```

Further, the threat analysis unit 114, when executed by one or more processors of the system 100, recommends the plurality of preventive measures for each of the plurality of attack personas based on the plurality of security assessment vectors using the ranking method, wherein the ranking method selects the plurality of preventive measures with the minimum distance between a preventive measure and an attack persona. For an example persona: {features:1, parameter:0, model:1, input/output:0, training:1, test:1, integrity:1, availability:0, skill:2, accessibledata:40} and the corresponding metrics is: {error:40%, FPR:30%, TPR:60%, fraction:10%, performance_cpu:25%, performance_mem:60%, susceptibility: high}, the preventive measure with minimum distance with vector is suggested as a best possible preventive measure among the plurality of security assessment vectors. For example, the preventive measure for the example persona mentioned above is {data sanitization: outlier detection, robust learning method, pre-processing, validation against known baseline, limiting queries, penalize users/data points}.

In an embodiment, the system 100 recommends the appropriate preventive steps depends upon the level of the vulnerability of the application. The level of vulnerability can be low (L), medium (M) and high (H). For example, the low score indicates that 1%-25% of the ML based application is at risk, medium indicates 26%-75% of the ML based application is at risk and high indicates 76%-100% of the ML based application is at risk. Further, the system 100 accommodates data sanitization checks such as outlier detection or anomaly detection of the perturbed input data points. If the application is vulnerable to the adversarial label noise, the prevention measure suggests to incorporate the sanitization functionality with the application which can prevent mild data-driven attacks. Similarly, as the vulnerability score increases the system suggests complex preventive measures.

In an embodiment, the ranking method is used to estimate the top preventive measures against the attacks. Each preventive measure is also encoded as a vector, which is similar to the output vector of the security-evaluation-metrics, that is, {error rate, FPR/TPR, fraction of compromised components, attack complexity, susceptibility of the application}. For a given persona 'P', the plurality of preventive measures are available and each preventive measure is ranked based on the ranking method and only top five preventive measures are recommended. The ranking is performed by using the distance $D_{A,B}$ between the preventive measures and each attack personas.

In an embodiment, the distance is computed by using equation 1.

$$D_{A,B} = 1 - \text{similarity}(\text{attack persona}(A), \text{preventive measure}(B)) \quad (1)$$

Where, 'B' is a preventive measure. The similarity is computed using the cosine similarity given in equation 2.

$$\text{Similarity} = \cos(\theta) = \frac{AB}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad (2)$$

In another embodiment, the rank is computed based on the Pearson Correlation Coefficient (PCC) given in equation 3.

$$\rho_{X,Y} = \frac{\text{cov}(X, Y)}{\sigma_X \sigma_Y} \quad (3)$$

Where, cov(X, Y) given in equation 4 is the co-variance (which is the measure of the joint variability of two random variables), the standard deviation of X is σX and the standard deviation of Y is σY. The mean of X is μX. The mean of Y is μY $$\text{cov}(X,Y) = E[(X-\mu_x)(Y-\mu_y)] \quad (4)$$

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of recommending a preventive measure for data driven application like ML based applications. Here, label flipping is performed for generating poisoned data set and the ML model is trained using the poisoned data set which increases the accuracy of the system 100. The plurality of threat attributes used for creating the plurality of attack personas further improves the accuracy of the system 100. The algorithm used for generating the poisoned data reduces the time complexity by using the loss function based technique. Further, the plurality of security assessment vectors are computed only for a set of attack personas selected based on the priority values and the corresponding system constraints which further improves the time complexity of the system 100.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor implemented method, the method comprising:
   receiving, via one or more hardware processors, a Machine Learning (ML) based application to be tested;
   aggregating, via the one or more hardware processors, data associated with the ML application to be tested from a plurality of external data sources;
   computing, via the one or more hardware processors, a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested;

computing, via the one or more hardware processors, a poisoned dataset based on the plurality of feature vectors by using a label flipping, wherein the poisoned data set is a perturbed sample generated based on an impact of a corresponding feature in the ML based application to be tested;

performing, via the one or more hardware processors, a training of a ML model with the aggregated data and the poisoned dataset;

simultaneously combining, via the one or more hardware processors, a plurality of threat attributes to generate a plurality of personas, wherein each of the plurality of threat attributes is associated with a numeric value;

computing, via the one or more hardware processors, a priority value for each of the plurality of personas based on the numeric value associated with each of the plurality of threat attributes corresponding to each of the plurality of personas by using one of, a summing of the numeric values associated with each plurality of threat attributes, a simple average method and a weighted average method;

sorting, via the one or more hardware processors, the plurality of personas in a descending order based on the corresponding priority value to obtain a plurality of sorted personas;

selecting, via the one or more hardware processors, a plurality of attack personas from the plurality of sorted personas based on a plurality of pre-determined threshold values corresponding to each of a plurality of system constraints associated with the system;

computing, via the one or more hardware processors, a security assessment vector for each of the plurality of attack personas based on a plurality of security evaluation metrics by using the trained ML model, by:
 computing, via the ML model trained using the aggregated data, a first set of security evaluation metrics for each of the plurality of attack personas;
 computing, via the ML model trained using the aggregated data, a second set of security evaluation metrics for each of the plurality of attack personas; and
 computing a difference between each element of the first set of security evaluation metrics and each element of the second set of security evaluation metrics to obtain the security assessment vector corresponding to each of the plurality of attack personas;

recommending, via the one or more hardware processors, a plurality of preventive measures for each of the plurality of attack personas based on the security assessment vector using a ranking method, wherein the ranking method selects the plurality of preventive measures based on a minimum distance between a preventive measure and an attack persona.

2. The processor implemented method of claim 1, wherein the data comprises textual data, binary data and multimedia data, wherein the data is one of, a structured data, an unstructured data and a semi-structured data, and wherein the plurality of external data sources comprising online and offline data sources.

3. The processor implemented method of claim 1, wherein the plurality of feature engineering techniques comprising a bag of words, a scalarisation, a normalization, a recoding, and a feature transformation.

4. The processor implemented method of claim 1, wherein computing the poisoned data set based on the plurality of feature vectors by using the label flipping comprises:
 receiving a flip budget, the data, the plurality of feature vectors and the corresponding label vectors, wherein the flip budget is a pre-computed based on a plurality of constraints comprising a number of queries and a type of updation performed by the ML model comprising one of, a batch updation and an online updation;
 segmenting the data into a training data and a testing data;
 computing a loss function based on the training data, the plurality of feature vectors of the training data and the corresponding label vectors by using an optimization algorithm, wherein the optimization algorithm comprises one of, a gradient based optimization algorithm and a non-gradient based algorithm;
 sorting the training data based on the computed loss function;
 selecting a plurality of data points from the sorted training data based on the flip budget; and
 flipping one or more label vectors of the plurality of selected data points to generate the poisoned data set.

5. The processor implemented method of claim 1, wherein the plurality of threat attributes comprises an attacker's skill, an attack time constraint, a percentage of data accessible to an attacker, a number of attacker queries, a complexity of an attack, a transferability of the attack, an attacker's knowledge about an ML model, an attacker's reachability to the dataset and an attacker's goal.

6. The processor implemented method of claim 1, wherein the plurality of system constraints comprises a number of queries, a type of updation performed by the ML model, a network latency, a system load, a query processing time, a processing limit of a data poisoning algorithm, a time delay between successive queries, a percentage of total data size and a size of the dataset.

7. The processor implemented method of claim 1, wherein the plurality of security evaluation metrics comprises a performance degradation, a False Positive Rate (FPR), a True Positive Rate (TPR), a fraction of compromised components, the attack performance and a susceptibility of the ML model.

8. A system comprising:
 at least one memory storing programmed instructions;
 one or more Input/Output (I/O) interfaces; and
 one or more hardware processors operatively coupled to the at least one memory, wherein the one or more hardware processors are configured by the programmed instructions to:
 receive a Machine Learning (ML) based application to be tested;
 aggregate data associated with the ML application to be tested from a plurality of external data sources;
 compute a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested;
 compute a poisoned data set based on the plurality of feature vectors by using a label flipping, wherein the poisoned dataset is a perturbed sample generated based on an impact of a corresponding feature in the ML based application to be tested;
perform via the one or more hardware processors, a training of a ML model with the aggregated data and the poisoned dataset;
simultaneously combine via the one or more hardware processors, a plurality of threat attributes to generate a plurality of personas, wherein each of the plurality of threat attributes is associated with a numeric value;
compute a priority value for each of the plurality of personas based on the numeric value associated with each of the plurality of threat attributes corresponding to each of the plurality of personas by using one of, a summing of the numeric values associated with each plurality of threat attributes, a simple average method and a weighted average method;
sort the plurality of personas in a descending order based on the corresponding priority value to obtain a plurality of sorted personas;
selecting a plurality of attack personas from the plurality of sorted personas based on a plurality of pre-determined threshold values corresponding to each of a plurality of system constraints associated with the system;
compute a security assessment vector for each of the plurality of attack personas based on a plurality of security evaluation metrics by using the trained ML model, by:
  computing, via the ML model trained using the aggregated data, a first set of security evaluation metrics for each of the plurality of attack personas;
  computing, via the ML model trained using the aggregated data, a second set of security evaluation metrics for each of the plurality of attack personas; and
  computing a difference between each element of the first set of security evaluation metrics and each element of the second set of security evaluation metrics to obtain the security assessment vector corresponding to each of the plurality of attack personas;
recommend a plurality of preventive measures for each of the plurality of attack personas based on the security assessment vector using a ranking method, wherein the ranking method selects the plurality of preventive measures based on a minimum distance between a preventive measure and an attack persona.

9. The system of claim 8, wherein the data comprises textual data, binary data and multimedia data, wherein the data is one of, a structured data, an unstructured data and a semi-structured data, and wherein the plurality of external data sources comprising online and offline data sources.

10. The system of claim 8, wherein the plurality of feature engineering techniques comprising a bag of words, a scalarisation, a normalization, a recoding and a feature transformation.

11. The system of claim 8, wherein computing the poisoned data set based on the plurality of feature vectors by using the label flipping comprises:
receiving a flip budget, the data, the plurality of feature vectors and the corresponding label vectors, wherein the flip budget is a pre-computed based on a plurality of constraints comprising a number of queries and a type of updation performed by the ML model comprising one of, a batch updation and an online updation;
segmenting the data into a training data and a testing data;
computing a loss function based on the training data, the plurality of feature vectors of the training data and the corresponding label vectors by using an optimization algorithm, wherein the optimization algorithm comprises one of, a gradient based optimization algorithm and a non-gradient based algorithm;
sorting the training data based on the computed loss function;
selecting a plurality of data points from the sorted training data based on the flip budget; and
flipping one or more label vectors of the plurality of selected data points to generate the poisoned data set.

12. The system of claim 8, wherein the plurality of threat attributes comprises an attacker's skill, an attack time constraint, a percentage of data accessible to an attacker, a number of attacker queries, a complexity of an attack, a transferability of the attack, an attacker's knowledge about an ML model, an attacker's reachability to the dataset and an attacker's goal.

13. The system of claim 8, wherein the plurality of system constraints comprises a number of queries, a type of updation performed by the ML model, a network latency, a system load, a query processing time, a processing limit of a data poisoning algorithm, a time delay between successive queries, a percentage of total data size and a size of the dataset.

14. The system of claim 8, wherein the plurality of security evaluation metrics comprises a performance degradation, a False Positive Rate (FPR), a True Positive Rate (TPR), a fraction of compromised components, the attack performance and a susceptibility of the ML model.

15. A non-transitory computer readable medium embodying a program executable in a computing device for predicting response time of an enterprise system, the program comprising:
receiving a Machine Learning (ML) based application to be tested;
aggregating data associated with the ML application to be tested from a plurality of external data sources;
computing a plurality of feature vectors based on the aggregated data by utilizing a plurality of feature engineering techniques, wherein each of the plurality of feature vectors is associated with a corresponding label vector, wherein the corresponding label vector is a significant attribute of a dataset associated with the ML application to be tested;
computing a poisoned data set based on the plurality of feature vectors by using a label flipping, wherein the poisoned dataset is a perturbed sample generated based on an impact of a corresponding feature in the ML based application to be tested;
performing a training of a ML model with the aggregated data and the poisoned dataset;
simultaneously combining a plurality of threat attributes to generate a plurality of personas, wherein each of the plurality of threat attributes is associated with a numeric value;
computing a priority value for each of the plurality of personas based on the numeric value associated with each of the plurality of threat attributes corresponding to each of the plurality of personas by using one of, a summing of the numeric values associated with each plurality of threat attributes, a simple average method and a weighted average method;
sorting the plurality of personas in a descending order based on the corresponding priority value to obtain a plurality of sorted personas;

selecting a plurality of attack personas from the plurality of sorted personas based on a plurality of pre-determined threshold values corresponding to each of a plurality of system constraints associated with the system;

computing a security assessment vector for each of the plurality of attack personas based on a plurality of security evaluation metrics by using the trained ML model, by:
  computing, via the ML model trained using the aggregated data, a first set of security evaluation metrics for each of the plurality of attack personas;
  computing, via the ML model trained using the aggregated data, a second set of security evaluation metrics for each of the plurality of attack personas; and
  computing a difference between each element of the first set of security evaluation metrics and each element of the second set of security evaluation metrics to obtain the security assessment vector corresponding to each of the plurality of attack personas;

recommending a plurality of preventive measures for each of the plurality of attack personas based on the security assessment vector using a ranking method, wherein the ranking method selects the plurality of preventive measures based on a minimum distance between a preventive measure and an attack persona.

16. The one or more non-transitory machine readable information storage mediums of claim 15, wherein the data comprises textual data, binary data and multimedia data, wherein the data is one of, a structured data, an unstructured data and a semi-structured data, and wherein the plurality of external data sources comprising online and offline data sources.

17. The one or more non-transitory machine readable information storage mediums of claim 15, wherein the plurality of feature engineering techniques comprising a bag of words, a scalarisation, a normalization, a recoding and a feature transformation.

18. The one or more non-transitory machine readable information storage mediums of claim 15, wherein computing the poisoned data set based on the plurality of feature vectors by using the label flipping comprises:
  receiving a flip budget, the data, the plurality of feature vectors and the corresponding label vectors, wherein the flip budget is a pre-computed based on a plurality of constraints comprising a number of queries and a type of updation performed by the ML model comprising one of, a batch updation and an online updation;
  segmenting the data into a training data and a testing data;
  computing a loss function based on the training data, the plurality of feature vectors of the training data and the corresponding label vectors by using an optimization algorithm, wherein the optimization algorithm comprises one of, a gradient based optimization algorithm and a non-gradient based algorithm;
  sorting the training data based on the computed loss function;
  selecting a plurality of data points from the sorted training data based on the flip budget; and
  flipping one or more label vectors of the plurality of selected data points to generate the poisoned data set.

19. The one or more non-transitory machine readable information storage mediums of claim 15, wherein the plurality of threat attributes comprises an attacker's skill, an attack time constraint, a percentage of data accessible to an attacker, a number of attacker queries, a complexity of an attack, a transferability of the attack, an attacker's knowledge about an ML model, an attacker's reachability to the dataset and an attacker's goal.

20. The one or more non-transitory machine readable information storage mediums of claim 15, wherein the plurality of system constraints comprises a number of queries, a type of updation performed by the ML model, a network latency, a system load, a query processing time, a processing limit of a data poisoning algorithm, a time delay between successive queries, a percentage of total data size and a size of the dataset.

\* \* \* \* \*